(12) United States Patent
Tantawy et al.

(10) Patent No.: US 8,901,065 B2
(45) Date of Patent: Dec. 2, 2014

(54) SPRAY-DRYING PROCESS

(71) Applicant: The Procter & Gamble Company, Cincinnati, OH (US)

(72) Inventors: Hossam Hassan Tantawy, Morpeth (GB); Larry Savio Cardozo, Newcastle upon Tyne (GB); Andre-Brian Greenaway Patton, Co Durham (GB)

(73) Assignee: The Procter & Gamble Company, Cincinnati, OH (US)

( * ) Notice: Subject to any disclaimer, the term of this patent is extended or adjusted under 35 U.S.C. 154(b) by 46 days.

(21) Appl. No.: 13/771,658

(22) Filed: Feb. 20, 2013

(65) Prior Publication Data
US 2013/0320575 A1 Dec. 5, 2013

(30) Foreign Application Priority Data
Jun. 1, 2012 (EP) ..................................... 12170462

(51) Int. Cl.
| | | |
|---|---|---|
| *C11D 11/02* | (2006.01) | |
| *C11D 3/37* | (2006.01) | |
| *C11D 17/06* | (2006.01) | |
| *B01J 2/04* | (2006.01) | |

(52) U.S. Cl.
CPC .. *C11D 11/02* (2013.01); *B01J 2/04* (2013.01)
USPC ........... 510/443; 510/452; 510/475; 510/495; 510/507; 510/510

(58) Field of Classification Search
CPC ...... C11D 11/02; C11D 17/06; C11D 3/1226; C11D 3/128; C11D 3/378; C11D 3/1253
USPC .................. 510/443, 452, 475, 495, 507, 510
See application file for complete search history.

(56) References Cited

U.S. PATENT DOCUMENTS

| | | | | |
|---|---|---|---|---|
| 3,978,176 | A | * | 8/1976 | Voegeli ...................... 261/122.1 |
| 4,006,110 | A | | 2/1977 | Kenney et al. |
| 4,478,735 | A | * | 10/1984 | Yazaki et al. .................. 510/452 |
| 4,549,978 | A | * | 10/1985 | Evans et al. .................... 510/443 |
| 5,998,356 | A | | 12/1999 | Alam et al. |
| 7,485,614 | B2 | | 2/2009 | Boucher et al. |
| 2003/0203832 | A1 | * | 10/2003 | Boucher et al. ............... 510/443 |
| 2006/0069007 | A1 | * | 3/2006 | Boucher et al. ............... 510/446 |
| 2011/0146099 | A1 | * | 6/2011 | Cardozo et al. .................. 34/339 |
| 2011/0147962 | A1 | * | 6/2011 | Cardozo et al. .................... 264/5 |
| 2011/0147964 | A1 | * | 6/2011 | Cardozo et al. .................... 264/5 |

FOREIGN PATENT DOCUMENTS

WO   WO2010024468 A1 * 3/2010

OTHER PUBLICATIONS

EP Search Report, Application No. 1270462.1, dated Nov. 26, 2012, containing 6 pages.

* cited by examiner

*Primary Examiner* — Lorna M Douyon
(74) *Attorney, Agent, or Firm* — John T. Dipre; Steven W. Miller

(57) ABSTRACT

The present invention is to a process for preparing a spray-dried detergent powder comprising: (a) forming an aqueous detergent slurry in a mixer; (b) transferring the aqueous detergent slurry from the mixer to a pipe leading through a first pump and then through a second pump to a spray nozzle; (c) contacting a liquid detergent ingredient having a viscosity of less than 2 Pa·s to the aqueous detergent slurry in the pipe after the first pump and before the second pump to form a mixture; (d) spraying the mixture through the spray nozzle into a spray-drying tower; and (e) spray-drying the mixture to form a spray-dried powder, wherein a nitrogen-rich gas is introduced between the first and second pumps.

16 Claims, No Drawings

SPRAY-DRYING PROCESS

FIELD OF THE INVENTION

The present invention relates to a spray-drying process.

BACKGROUND OF THE INVENTION

Spray-drying is the standard method for manufacturing laundry detergent base powder. Typically, detergent ingredients are mixed together to form an aqueous detergent slurry in a mixer, such as a crutcher mixer. This slurry is then transferred along a pipe through a first low pressure pump and then through a second high pressure pump to a spray nozzle. Between the first and second pumps, a liquid detergent ingredient is added. From the second pump, the slurry is then sprayed into a spray-drying tower, and spray-dried to form a spray-dried powder. The slurry in the pipe between the high pressure pump and the spray nozzle is at high pressure.

Consumers are used to dosing a particular quantity of detergent powder into the wash. If the density of the powder is too high then they will tend to overdose, since the same volume of high density powder contains more detergent active material than an equal volume of low density powder. Thus, it is desirable to produce laundry detergent powder with a low density.

Traditionally, nitrogen-rich gas is injected into the high pressure pipe between the high pressure pump and the spray nozzle. The nitrogen-rich gas is mixed with the slurry to form a slurry containing nitrogen-rich gas bubbles. Thus, the nitrogen-rich gas bubbles are dispersed in the high pressure slurry and trapped within the spray-dried slurry droplets during drying and subsequently trapped in the spray-dried powder.

However, a problem with this method is the low efficiency of entrapment of the nitrogen-rich gas bubbles. Thus, to achieve low densities large volumes of nitrogen-rich gas need to be pumped into the high pressure slurry. This is inefficient and expensive due to the equipment required to achieve pumping of the large volumes of nitrogen-rich gas.

Thus, there is a need in the art to improve the efficacy of nitrogen-rich gas capture to achieve low density detergent powders.

The Inventors have surprisingly found that introduction of the nitrogen-rich gas into the slurry between the first and second pumps, increases the efficiency of bubble entrapment and so results in lower density spray-dried detergent powder at much lower injected levels of nitrogen-rich gas.

SUMMARY OF THE INVENTION

The present invention is to a process for preparing a spray-dried detergent powder comprising:
  (i) detersive surfactant; and
  (ii) other detergent ingredients;
wherein the process comprises the steps of:
  (a) forming an aqueous detergent slurry in a mixer;
  (b) transferring the aqueous detergent slurry from the mixer to a pipe leading through a first pump and then through a second pump to a spray nozzle;
  (c) contacting a liquid detergent ingredient having a viscosity of less than 2 Pa·s to the aqueous detergent slurry in the pipe after the first pump and before the second pump to form a mixture;
  (d) spraying the mixture through the spray nozzle into a spray-drying tower; and
  (e) spray-drying the mixture to form a spray-dried powder, wherein a nitrogen-rich gas is introduced between the first and second pumps.

DETAILED DESCRIPTION OF THE INVENTION

A Process for Preparing a Spray-Dried Detergent Powder

The process comprises the steps of: (a) forming an aqueous detergent slurry in a mixer; (b) transferring the aqueous detergent slurry from the mixer to a pipe leading through a first pump and then through a second pump to a spray nozzle; (c) contacting a liquid detergent ingredient having a viscosity of less than 2 Pa·s to the aqueous detergent slurry in the pipe after the first pump and before the second pump to form a mixture; (d) spraying the mixture through the spray nozzle into a spray-drying tower; and (e) spray-drying the mixture to form a spray-dried powder, wherein a nitrogen-rich gas is introduced between the first and second pumps.

Step (a): the aqueous detergent slurry can be formed by mixing in any suitable vessel, such as a mixer, in the standard manner. Suitable mixers include vertical mixers, slurry mixers, tank agitators, crutcher mixers and the like.

Step (b): the aqueous detergent slurry is transferred from the mixer through at least a first pump and a second pump to a spray nozzle. Typically, the aqueous detergent slurry is transferred in a pipe. The aqueous slurry is typically transferred through an intermediate storage vessel such as a drop tank, for example when the process is semi-continuous. Alternatively, the process can be a continuous process, in which case no intermediate storage vessel is required. The aqueous detergent slurry is transferred through at least two, or even at least three or more pumps, although two pumps may be preferred. Typically, when two or more pumps are used, the first pump is a low pressure pump, such as a pump that is capable of generating a pressure of from $3 \times 10^5$ to $1 \times 10^6$ Pa, and the second pump is a high pressure pump, such as a pump that is capable of generating a pressure of from $2 \times 10^6$ to $1 \times 10^7$ Pa. Optionally, the aqueous detergent slurry is transferred through a disintegrator, such as disintegrators supplied by Hosakawa Micron. The disintegrator can be positioned before the pump, or after the pump. If two or more pumps are present, then the disintegrator can also be positioned between the pumps. Typically, the pumps, disintegrators, intermediate storage vessels, if present, are all in series configuration. However, some equipment may be in a parallel configuration. A suitable spray nozzle is a Spray Systems T4 Nozzle.

Step (c): a liquid detergent ingredient is contacted to the aqueous detergent slurry in the pipe after the first pump and before the second pump to form a mixture. Suitable detergent ingredients for use in step (c) are described in more detail later in the description. Preferably, the mixture formed in step (c) comprises from 20 wt % to 35 wt % water. Preferably, the detergent ingredient is contacted to the aqueous detergent slurry at a point in the pipe that is nearer to the second pump than the first pump. It may even be preferred for the detergent ingredient to be contacted to the aqueous detergent slurry in the pipe just prior to the entrance to the second pump.

The liquid detergent ingredient typically has a viscosity of less than 2 Pa·s, preferably less than 1 Pa·s, most preferably less than 0.5 Pa·s. The viscosity is typically measured using a rheometer at a shear rate of 100 s$^{-1}$ and at a temperature of 70° C. Those skilled in the art will recognize suitable apparatus in order to measure the viscosity. An exemplary method is to measure the viscosity at a shear rate of 100 s$^{-1}$ at temperature of 70° C., using a TA AR 2000ex, controlled stress rheometer, using a TA Instruments Peltier Concentric Cylinder Conical DIN System, hard anodized Aluminium cup and rotor, having a rotor radius of 14 mm, a rotor height of 42 mm, a cup radius of 15 mm, and a sample volume of 19.6 ml. Without wishing to be bound by theory, dispersing a gas into a fluid gets increasingly difficult as the fluid viscosity increases. Thus, for effective gas dispersion into the liquid, it is preferable that the viscosity of the liquid is lower.

The nitrogen-rich gas could be pumped directly into the aqueous detergent slurry between the first pump and second pump. By 'nitrogen-rich gas' we herein mean a gas that comprises greater than 50% by weight of nitrogen. The nitrogen-rich gas can be air. By 'air' we herein mean atmospheric air. In one aspect, the gas could be argon-rich gas, or carbon-dioxide rich gas. By 'argon-rich' gas we herein mean a gas that comprises greater than 50 wt % argon, and by 'carbon dioxide rich gas' we herein mean a gas that comprises greater than 50 wt % carbon dioxide. Without wishing to be bound by theory, nitrogen-rich gas is preferred, as unlike a carbon dioxide rich gas, when it dissolves in the liquid detergent ingredient it does not form a dilute acid which can have a negative effect on the final product density. The dilute acid formed by the carbon dioxide rich gas is neutralized when it contacts the slurry (which is alkaline) and so forms a salt. The salt can subsequently block pipes and other lines in the apparatus. Nitrogen-rich gas is preferred over argon-rich gas as argon is expensive, making it uneconomical to use on a commercial scale. If a disintegrator is present, then the nitrogen-rich gas is injected between the first pump and the disintegrator. Preferably, the nitrogen-rich gas is introduced after the first pump and before contact of the liquid detergent ingredient. Preferably, nitrogen-rich gas is introduced into the aqueous detergent slurry via a porous metal sparger, such as ones commercially available from Mott Corporation of Farmington Conn., USA.

A nitrogen-rich gas may be pumped into the liquid detergent ingredient which is then contacted with the aqueous slurry between the first and second pumps. Preferably, the nitrogen-rich gas is introduced at a pressure of between 0.1 MPa and 2 MPa, preferably between 0.1 MPa and 1.5 MPa. The nitrogen-rich gas may be introduced into the liquid detergent ingredient using any suitable gas injection device. It is preferred that the nitrogen-rich gas is injected into the liquid detergent ingredient, as more effective gas dissolution is achieved when it is pumped into liquid detergent ingredient rather than the aqueous detergent slurry. In one aspect, the nitrogen-rich gas is introduced into the liquid detergent ingredient via a conventional drilled pipe sparger. Those skilled in the art will recognize suitable devices. In another aspect, the nitrogen-rich gas is introduced via a porous metal sparger, such as ones commercially available from Mott Corporation of Farmington Conn., USA. A Mott Corporation Intrusive pipeline sparger may be used, in which the porous metal sparger is located within the pipe carrying the liquid detergent ingredient, or similar such devices may be used. Without wishing to be bound by theory, the porous metal sparger produces larger numbers of smaller air bubbles in the liquid detergent ingredient, opposed to fewer larger bubbles as are seen using conventional drilled pipe spargers. In comparison to larger bubbles, smaller bubbles increase the speed of dissolution of nitrogen-rich gas into the detergent liquid and so further improve the efficiency of gas capture.

Without wishing to be bound by theory, it is believed that introduction of the nitrogen-rich gas into the aqueous slurry between the first and second pumps, or via the liquid detergent ingredient increases efficiency of the gas capture during the spray drying process. Currently, nitrogen-rich gas is introduced into the high pressure slurry line after the second pump and prior to spraying into the tower. Since the gas is introduced at a high pressure, the large pressure drop experienced when it exits the spray nozzle causes large expansion of the volume of the air bubbles in the slurry. Due to the large size of the gas bubbles following expansion, they are not captured within the slurry droplets being spray-dried. By introducing the gas bubbles at lower pressure, there is a lower total volume expansion of the gas bubbles upon reduction in pressure as the slurry is sprayed, and hence more gas is captured within the spray-dried product.

The liquid detergent ingredient is then passed through a pipe and contacted with the aqueous detergent slurry to form a mixture. The pipe may comprise an orifice. If present the ratio of the diameter of the orifice to the inner diameter of the pipe comprising the orifice can be from 0.025:1 to 0.3:1, preferably 0.04:1 to 0.25:1, most preferably 0.05:1 to 0.2:1. The diameter of the orifice may be adjustable. Without wishing to be bound by theory, the presence of the orifice may be beneficial in that it breaks larger gas bubbles into smaller gas bubbles and aids in dispersion of the gas into the liquid.

The mass ratio of nitrogen-rich gas to total slurry may be from 0.0001:1, preferably from, 0.0003:1, more preferably from 0.00075:1, most preferably from 0.001:1.

The flow rate of the aqueous detergent slurry along the pipe between the first and second pump prior to step (c) is typically in the range of from 800 kg/hour to 100,000 kg/hour, and the flow rate of the detergent ingredient into the pipe during step (c) is typically in the range of from 100 kg/hour to 8000 kg/hour.

Step (d): the mixture formed in step (c) is sprayed through the spray nozzle into a spray-drying tower. Preferably, the mixture is at a temperature of from 60° C. to 140° C. when it is sprayed through the spray nozzle into a spray-drying tower. Suitable spray-drying towers are co-current or counter-current spray-drying towers. The mixture is typically sprayed at a pressure of from $6\times10^6$ Pa to $1\times10^7$ Pa.

Step (e): the mixture is spray-dried to form a spray-dried powder. Preferably, the exhaust air temperature is in the range of from 60° C. to 100° C.

Aqueous Detergent Slurry

The aqueous detergent slurry typically comprises detergent ingredients, such as alkalinity source, polymer, builder, detersive surfactant, filler salts and mixtures thereof. However, it may be especially preferred for the aqueous detergent slurry to comprise low levels, or even be free, of detersive surfactant. It may also be especially preferred for the aqueous detergent slurry to comprise low levels, or even be free, of builder. Preferably, the aqueous detergent slurry comprises from 0 wt % to 5 wt %, or to 4 wt %, or to 3 wt %, or to 2 wt %, or to 1 wt % detersive surfactant. It may even be preferred for the aqueous detergent slurry to be essentially free of detersive surfactant. By essentially free of it is typically meant herein to mean: "comprises no deliberately added".

However, it should be understood that the mixture obtained following addition of the liquid detergent ingredient may comprise detersive surfactant.

It may be highly advantageous for the aqueous detergent slurry to comprise low levels, or even be completely free, of detersive surfactants that are difficult to process when in slurry form and exposed to the residence time and process conditions typically experienced by an aqueous detergent slurry during a conventional spray-drying process. Such detersive surfactants include mid-chain branched detersive surfactants, especially mid-chain branched anionic detersive surfactants, and/or alkoxylated detersive surfactants, especially alkoxylated anionic detersive surfactants. Preferably, the aqueous detergent slurry formed in step (a) comprises from 0 wt % to 2 wt %, preferably to 1 wt % mid-chain branched detersive surfactant. Preferably, the aqueous detergent slurry formed in step (a) is essentially free from mid-chain branched detersive surfactant. By essentially free from, it is typically meant herein to mean: "comprises no deliberately added". Preferably, the aqueous detergent slurry formed in step (a) comprises from 0 wt % to 2 wt %, preferably to 1 wt % alkoxylated detersive surfactant. Preferably, the aqueous detergent slurry formed in step (a) is essentially free from alkoxylated detersive surfactant. By essentially free from, it is typically meant herein to mean: "comprises no deliberately added".

Preferably, the aqueous detergent slurry comprises from 0 wt % to 10 wt %, or to 9 wt %, or to 8 wt %, or to 7 wt %, or to 6 wt %, or to 5 wt %, or to 4 wt %, or to 3 wt %, or to 2 wt %, or to 1 wt % zeolite builder. Preferably, the aqueous detergent slurry is essentially free of zeolite builder.

Preferably, the aqueous detergent slurry comprises from 0 wt % to 10 wt %, or to 9 wt %, or to 8 wt %, or to 7 wt %, or to 6 wt %, or to 5 wt %, or to 4 wt %, or to 3 wt %, or to 2 wt %, or to 1 wt % phosphate builder. Preferably, the aqueous detergent slurry is essentially free of phosphate builder.

Preferably the aqueous detergent slurry is alkaline. Preferably, the aqueous detergent slurry has a pH of greater than 7.0, preferably greater than 7.7, or greater than 8.1, or even greater than 8.5, or greater than 9.0, or greater than 9.5, or greater than 10.0, or even greater than 10.5, and preferably to 14, or to 13, or to 12.

Preferably, the aqueous detergent slurry has a viscosity of from 0.1 Pas to 1 Pas. The viscosity is typically measured using a rheometer at a shear of $100\ s^{-1}$ and a temperature of 70° C. Those skilled in the art will recognize suitable apparatus in order to measure the viscosity. An exemplary method is to measure the viscosity at a shear rate of $100\ s^{-1}$ at temperature of 70° C., using a TA AR 2000ex, controlled stress rheometer, using a TA Instruments Peltier Concentric Cylinder Conical DIN System, hard anodized Aluminium cup and rotor, having a rotor radius of 14 mm, a rotor height of 42 mm, a cup radius of 15 mm, and a sample volume of 19.6 ml.

Liquid Detergent Ingredient Suitable for Contacting to the Aqueous Detergent Slurry in Step (c)

Any detergent ingredient can be used for contacting the aqueous detergent slurry in step (c). The liquid detergent ingredient may comprise a detersive surfactant (as described in more detail below), a polymer (as described in more detail below) or a mixture thereof. However, highly preferred liquid detergent ingredients are selected from: alkyl benzene sulphonic acid or salt thereof; polymer; alkoxylated detersive surfactant; sodium hydroxide; mid-chain branched detersive surfactant; cationic detersive surfactant; and mixtures thereof.

Preferably, in step (c) the detergent ingredient comprises alkyl benzene sulphonic acid or salt thereof. Preferably, in step (c) the detergent ingredient comprises alkoxylated detersive surfactant. Preferably, in step (c) the detergent ingredient comprises sodium hydroxide. Preferably, in step (c) the detergent ingredient comprises mid-chain branched detersive surfactant. Preferably, in step (c) the detergent ingredient comprises polymer. The polymer can be a polycarboxylate polymer, preferably a polyacrylate homo- or co-polymer. The polymer can be a maleic acid/acrylic acid co-polymer.

Spray-Dried Detergent Powder

The spray-dried detergent powder typically comprises: (i) detersive surfactant; and (ii) other detergent ingredients. Highly preferably, the spray-dried detergent powder comprises: (a) from 0 wt % to 10 wt % zeolite builder; (b) from 0 wt % to 10 wt % phosphate builder; and (c) optionally from 0 wt % to 15 wt % silicate salt.

The spray-dried detergent powder is suitable for any detergent application, for example: laundry, including automatic washing machine laundering and hand laundering, and even bleach and laundry additives; hard surface cleaning; dish washing, especially automatic dish washing; carpet cleaning and freshening. However, highly preferably, the spray-dried detergent powder is a spray-dried laundry detergent powder.

The spray-dried detergent powder can be a fully formulated detergent product, such as a fully formulated laundry detergent product, or it can be combined with other particles to form a fully formulated detergent product, such as a fully formulated laundry detergent product. The spray-dried laundry detergent particles may be combined with other particles such as: enzyme particles; perfume particles including agglomerates or extrudates of perfume microcapsules, and perfume encapsulates such as starch encapsulated perfume accord particles; surfactant particles, such as non-ionic detersive surfactant particles including agglomerates or extrudates, anionic detersive surfactant particles including agglomerates and extrudates, and cationic detersive surfactant particles including agglomerates and extrudates; polymer particles including soil release polymer particles, cellulosic polymer particles; filler particles including sulphate salt particles, especially sodium sulphate particles; buffer particles including carbonate salt and/or silicate salt particles, preferably a particle comprising carbonate salt and silicate salt such as a sodium carbonate and sodium silicate co-particle, and particles and sodium bicarbonate; other spray-dried particles; fluorescent whitening particles; aesthetic particles such as coloured noodles or needles or lamellae particles; bleaching particles such as percarbonate particles, especially coated percarbonate particles, including carbonate and/or sulphate coated percarbonate, silicate coated percarbonate, borosilicate coated percarbonate, sodium perborate coated percarbonate; bleach catalyst particles, such as transition metal catalyst bleach particles, and imine bleach boosting particles; performed peracid particles; hueing dye particles; and any mixture thereof.

In a highly preferred embodiment of the present invention, the spray-dried detergent powder comprises: (a) from 15 wt % to 30 wt % detersive surfactant; (b) from 0 wt % to 4 wt % zeolite builder; (c) from 0 wt % to 4 wt % phosphate builder; and (d) optionally from 0 wt % to 15 wt % silicate salt.

The spray-dried powder typically comprises from 0 wt % to 7 wt %, preferably from 1 wt % to 5 wt %, and preferably from 2 wt % to 3 wt % water.

The spray-dried particle is typically flowable, typically having a cake strength of from 0 N to 20 N, preferably from 0 N to 15 N, more preferably from 0 N to 10 N, most preferably from 0 N to 5 N. The method to determine the cake strength is described in more detail elsewhere in the description.

Method for Measuring Cake Strength

A smooth plastic cylinder of internal diameter 6.35 cm and length 15.9 cm is supported on a suitable base plate. A 0.65 cm hole is drilled through the cylinder with the centre of the hole being 9.2 cm from the end opposite the base plate.

A metal pin is inserted through the hole and a smooth plastic sleeve of internal diameter 6.35 cm and length 15.25 cm is placed around the inner cylinder such that the sleeve can move freely up and down the cylinder and comes to rest on the metal pin. The space inside the sleeve is then filled (without tapping or excessive vibration) with the spray-dried powder such that the spray-dried powder is level with the top of the sleeve. A lid is placed on top of the sleeve and a 5 kg weight placed on the lid. The pin is then pulled out and the spray-dried powder is allowed to compact for 2 minutes. After 2 minutes the weight is removed, the sleeve is lowered to expose the powder cake with the lid remaining on top of the powder.

A metal probe is then lowered at 54 cm/min such that it contacts the centre of the lid and breaks the cake. The maximum force required to break the cake is recorded and is the result of the test. A cake strength of 0 N refers to the situation where no cake is formed.

Detersive Surfactant

Suitable detersive surfactants include anionic detersive surfactants, non-ionic detersive surfactant, cationic detersive surfactants, zwitterionic detersive surfactants and amphoteric detersive surfactants.

Preferred anionic detersive surfactants include sulphate and sulphonate detersive surfactants.

Preferred sulphonate detersive surfactants include alkyl benzene sulphonate, preferably $C_{10-13}$ alkyl benzene sulphonate. Suitable alkyl benzene sulphonate (LAS) is obtainable, preferably obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable.

Preferred sulphate detersive surfactants include alkyl sulphate, preferably $C_{8-18}$ alkyl sulphate, or predominantly $C_{12}$ alkyl sulphate.

Another preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 7, more preferably from 0.5 to 5 and most preferably from 0.5 to 3.

The alkyl sulphate, alkyl alkoxylated sulphate and alkyl benzene sulphonates may be linear or branched, substituted or un-substituted.

Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein preferably the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, preferably having an average degree of alkoxylation of from 1 to 30; alkylpolysaccharides, preferably alkylpolyglycosides; polyhydroxy fatty acid amides; ether capped poly(oxyalkylated) alcohol surfactants; and mixtures thereof.

Preferred non-ionic detersive surfactants are alkyl polyglucoside and/or an alkyl alkoxylated alcohol.

Preferred non-ionic detersive surfactants include alkyl alkoxylated alcohols, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched, and substituted or un-substituted.

Suitable cationic detersive surfactants include alkyl pyridinium compounds, alkyl quaternary ammonium compounds, alkyl quaternary phosphonium compounds, alkyl ternary sulphonium compounds, and mixtures thereof.

Preferred cationic detersive surfactants are quaternary ammonium compounds having the general formula:

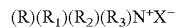

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate. Preferred cationic detersive surfactants are mono-$C_{6-18}$ alkyl mono-hydroxyethyl di-methyl quaternary ammonium chlorides. Highly preferred cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Polymer

The polymer can be any suitable polymer.

One suitable polymer is an amphiphilic graft polymer (AGP). Suitable AGPs are obtainable by grafting a polyalkylene oxide of number average molecular weight from about 2,000 to about 100,000 with vinyl acetate, which may be partially saponified, in a weight ratio of polyalkylene oxide to vinyl acetate of about 1:0.2 to about 1:10. The vinyl acetate may, for example, be saponified to an extent of up to 15%. The polyalkylene oxide may contain units of ethylene oxide, propylene oxide and/or butylene oxide. Selected embodiments comprise ethylene oxide.

In some embodiments the polyalkylene oxide has a number average molecular weight of from about 4,000 to about 50,000, and the weight ratio of polyalkylene oxide to vinyl acetate is from about 1:0.5 to about 1:6. A material within this definition, based on polyethylene oxide of molecular weight 6,000 (equivalent to 136 ethylene oxide units), containing approximately 3 parts by weight of vinyl acetate units per 1 part by weight of polyethylene oxide, and having itself a molecular weight of about 24,000, is commercially available from BASF as Sokalan HP22.

Suitable AGPs may be present in the detergent composition at weight percentages of from about 0 to about 5%, preferably from about above 0% to about 4%, or from about 0.5% to about 2%. In some embodiments, the AGP is present at greater than about 1.5 wt %. The AGPs are found to provide excellent hydrophobic soil suspension even in the presence of cationic coacervating polymers.

Preferred AGPs are based on water-soluble polyalkylene oxides as a graft base and side chains formed by polymerization of a vinyl ester component. These polymers having an average of less than or equal to one graft site per 50 alkylene oxide units and mean molar masses (Mw) of from about 3000 to about 100,000.

Another suitable polymer is polyethylene oxide, preferably substituted or unsubstituted.

Another suitable polymer is cellulosic polymer, preferably selected from alkyl cellulose, alkyl alkoxyalkyl cellulose, carboxylalkyl cellulose, alkyl carboxyalkyl, more preferably selected from carboxymethyl cellulose (CMC) including blocky CMC, methyl cellulose, methyl hydroxyethyl cellulose, methyl carboxymethyl cellulose, and mixtures thereof.

Other suitable polymers are soil release polymers. Suitable polymers include polyester soil release polymers. Other suitable polymers include terephthalate polymers, polyurethanes, and mixtures thereof. The soil release polymers, such as terephthalate and polyurethane polymers can be hydrophobically modified, for example to give additional benefits such as sudsing.

Other suitable polymers include polyamines, preferably polyethylene imine polymers, preferably having ethylene oxide and/or propylene oxide functionalized blocks Other suitable polymers include synthetic amino containing amphoteric/and/or zwitterionic polymers, such as those derived from hexamethylene diamine.

Another suitable polymer is a polymer that can be co-micellized by surfactants, such as the AGP described in more detail above.

Other suitable polymers include carboxylate polymers, such as polyacrylates, and acrylate/maleic co-polymers and other functionalized polymers such as styrene acrylates.

Other suitable polymers include silicone, including amino-functionalised silicone.

Other suitable polymers include polysaccharide polymers such as celluloses, starches, lignins, hemicellulose, and mixtures thereof.

Suitable polymers can include clay and soil removal/anti-redeposition agents being co-polymers comprising:
(i) from 50 to less than 98 wt % structural units derived from one or more monomers comprising carboxyl groups; (ii) from 1 to less than 49 wt % structural units derived from one or more monomers comprising sulfonate moieties; and (iii) from 1 to 49 wt % structural units derived from one or more types of monomers selected from ether bond-containing monomers represented by formulas (I) and (II):

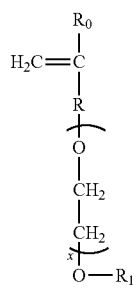

formula (I)

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

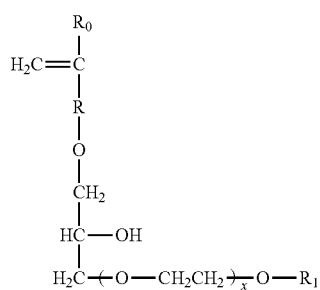

formula (II)

in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

Other suitable polymers include cationic polymers, such as deposition aid polymers, such as cationically modified cellulose such as cationic hydroxy ethylene cellulose, cationic guar gum, cationic starch, cationic acrylamides and mixtures thereof.

Mixtures of any of the above described polymers can be used herein.

Zeolite Builder

Suitable zeolite builder includes include zeolite A, zeolite P and zeolite MAP. Especially suitable is zeolite 4A.

Phosphate Builder

A typical phosphate builder is sodium tri-polyphosphate.

Silicate Salt

A suitable silicate salt is sodium silicate, preferably 1.6 R and/or 2.35 R sodium silicate.

Other Detergent Ingredients

The composition typically comprises other detergent ingredients. Suitable detergent ingredients include: transition metal catalysts; imine bleach boosters; enzymes such as amylases, carbohydrases, cellulases, laccases, lipases, bleaching enzymes such as oxidases and peroxidases, proteases, pectate lyases and mannanases; source of peroxygen such as percarbonate salts and/or perborate salts, preferred is sodium percarbonate, the source of peroxygen is preferably at least partially coated, preferably completely coated, by a coating ingredient such as a carbonate salt, a sulphate salt, a silicate salt, borosilicate, or mixtures, including mixed salts, thereof; bleach activator such as tetraacetyl ethylene diamine, oxybenzene sulphonate bleach activators such as nonanoyl oxybenzene sulphonate, caprolactam bleach activators, imide bleach activators such as N-nonanoyl-N-methyl acetamide, preformed peracids such as N,N-pthaloylamino peroxycaproic acid, nonylamido peroxyadipic acid or dibenzoyl peroxide; suds suppressing systems such as silicone based suds suppressors; brighteners; hueing agents; photobleach; fabric-softening agents such as clay, silicone and/or quaternary ammonium compounds; flocculants such as polyethylene oxide; dye transfer inhibitors such as polyvinylpyrrolidone, poly 4-vinylpyridine N-oxide and/or co-polymer of vinylpyrrolidone and vinylimidazole; fabric integrity components such as oligomers produced by the condensation of imidazole and epichlorhydrin; soil dispersants and soil anti-redeposition aids such as alkoxylated polyamines and ethoxylated ethyleneimine polymers; anti-redeposition components such as polyesters and/or terephthalate polymers, polyethylene glycol including polyethylene glycol substituted with vinyl alcohol and/or vinyl acetate pendant groups; perfumes such as perfume microcapsules, polymer assisted perfume delivery systems including Schiff base perfume/polymer complexes, starch encapsulated perfume accords; soap rings; aesthetic particles including coloured noodles and/or needles; dyes; fillers such as sodium sulphate, although it may be preferred for the composition to be substantially free of fillers; carbonate salt including sodium carbonate and/or sodium bicarbonate; silicate salt such as sodium silicate, including 1.6 R and 2.0 R sodium silicate, or sodium metasilicate; co-polyesters of di-carboxylic acids and diols; cellulosic polymers such as methyl cellulose, carboxymethyl cellulose, hydroxyethoxycellulose, or other alkyl or alkylalkoxy cellulose, and hydrophobically modified cellulose; carboxylic acid and/or salts thereof, including citric acid and/or sodium citrate; and any combination thereof.

Examples

Aqueous alkaline slurry composed of sodium sulphate, sodium carbonate, water, acrylate/maleate co-polymer and miscellaneous ingredients was prepared at 80° C. in a crutcher making vessel. The aqueous slurry was essentially free from zeolite builder and essentially free from phosphate builder. The slurry was mixed for least 25 minutes to ensure homogeneity of the slurry suspension and then transferred by means of a first pump into a 0.5 MPa pressurized pipe. Alkyl benzene sulphonic acid (HLAS) and sodium hydroxide were added to the aqueous slurry under pressure after the first pump. This aqueous slurry was pumped via a second pump at 8 MPa, 1640 kg/hr, through a standard spray system pressure nozzle and atomized into a counter current spray drying tower at an air inlet temperature of 275° C. High pressure air (11 MPa supply pressure, 1.5 kg/hr) was injected into the high pressure aqueous slurry after the second pump and prior to the spray nozzle. The atomized slurry was dried to produce a solid mixture, which was then cooled and sieved to remove oversize material (>1.8 mm) to form a spray-dried powder. The spray-dried powder had a moisture content of 2.5 wt %, a bulk density of 460 g/l and a particle size distribution such that greater than 80 wt % of the spray-dried powder had a particle size of from 150 to 710 micrometers. The composition of the spray-dried powder is given below in Table 1 and is described as POWDER A.

TABLE 1

Spray dried powder composition.

| Component | % w/w Spray Dried Powder; POWDER A |
|---|---|
| Sodium silicate salt | 10.0 |
| Linear alkyl benzene sulphonate | 15.1 |
| Acrylate/maleate copolymer | 4.0 |
| Hydroxyethane di(methylene phosphonic acid) | 0.7 |
| Sodium carbonate | 11.9 |
| Sodium sulphate | 53.7 |
| Water | 2.5 |
| Miscellaneous, such as magnesium sulphate, and one or more stabilizers | 2.1 |
| Total Parts | 100.00 |

A spray dried laundry detergent powder of the same composition as Powder A was made under similar conditions. However air (2 MPa supply pressure; 0.3 kg/hr) was injected via a mass flow controller into the HLAS line prior to adding to the aqueous slurry under pressure between the first and second pumps, and no air was injected into the high pressure slurry line as in powder A production. The spray-dried powder had a moisture content of 2.5 wt %, a bulk density of 470 g/l and a particle size distribution such that greater than 80 wt % of the spray-dried powder had a particle size of from 150 to 710 micrometers. This spray dried powder is described as POWDER B. As can be seen from Table 2 an almost identical bulk density of spray dried powder was achieved however the process to make Powder B required 80% less air.

TABLE 2

Bulk density and air consumption levels

| | Air injection consumption (kg/hr) | Bulk Density (g/l) |
|---|---|---|
| Blown Powder A | 1.5 | 470 |
| Blown Powder B | 0.3 | 460 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for preparing a spray-dried detergent powder comprising:
   (i) detersive surfactant; and
   (ii) other detergent ingredients;
   wherein the process comprises the steps of:
      (a) forming an aqueous detergent slurry in a mixer;
      (b) transferring the aqueous detergent slurry from the mixer to a pipe leading through a first pump and then through a second pump to a spray nozzle;
      (c) contacting a liquid detergent ingredient having a viscosity of less than about 2 Pa·s to the aqueous detergent slurry in the pipe after the first pump and before the second pump to form a mixture;
      (d) spraying the mixture through the spray nozzle into a spray-drying tower; and
      (e) spray-drying the mixture to form a spray-dried powder,
   wherein a nitrogen-rich gas is introduced between the first and second pumps; wherein the nitrogen-rich gas is pumped into the liquid detergent ingredient at a pressure of between about 0.1 MPa and about 2 MPa; and wherein no nitrogen-rich gas is injected after the second pump and prior to the spray nozzle.

2. The process according to claim 1, wherein the nitrogen-rich gas is air.

3. The process according to claim 1 wherein the nitrogen-rich gas is introduced via a gas sparger.

4. The process according to claim 1 wherein the liquid detergent ingredient comprises alkyl benzene sulphonic acid or salt thereof.

5. The process according to claim 1 wherein the mass ratio of nitrogen-rich gas to total slurry is from about 0.0001:1.

6. The process according to claim 5 wherein the mass ratio of nitrogen-rich gas to total slurry is from about 0.0003:1.

7. The process according to claim 6 wherein the mass ratio of nitrogen-rich gas to total slurry is from about 0.00075:1.

8. The process according to claim 1, wherein the liquid detergent has a viscosity of less than about 1 Pa·s.

9. The process according to claim 8, wherein the liquid detergent has a viscosity of less than about 0.5 Pa·s.

10. The process according to claim 1, wherein in step (c) the liquid detergent ingredient comprises a polymer.

11. The process according to claim 10, wherein the polymer is a clay and soil removal/anti-redeposition agent which comprises co-polymers comprising:
   (i) from about 50 to less than about 98 wt % structural units derived from one or more monomers comprising carboxyl groups;
   (ii) from about 1 to less than about 49 wt % structural units derived from one or more monomers comprising sulfonate moieties; and
   (iii) from about 1 to about 49 wt % structural units derived from one or more types of monomers selected from ether bond-containing monomers represented by formulas (I) and (II):

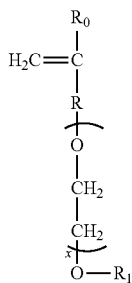

formula (I)

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group;

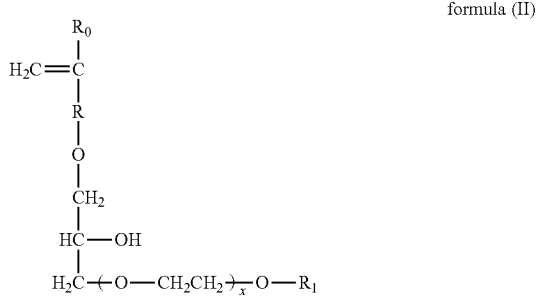

formula (II)

in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

12. The process according to claim 1, wherein the spray-dried detergent powder is spray-dried laundry detergent powder.

13. The process according to claim 1, wherein the spray-dried detergent powder comprises from about 0 wt % to about 10 wt % zeolite builder, from about 0 wt % to about 10 wt % phosphate builder, or a mixture thereof.

14. The process according to claim 1, wherein in step (c), the low viscosity liquid is passed through a pipe comprising an orifice prior to contacting the low viscosity liquid with the aqueous detergent slurry.

15. The process according to claim 14, wherein the ratio of the diameter of the orifice to the inner diameter of the pipe comprising the orifice is from about 0.025:1 to about 0.3:1.

16. The process according to claim 15, wherein the ratio of the diameter of the orifice to the inner diameter of the pipe comprising the orifice is from about 0.04:1 to about 0.25:1.

* * * * *